United States Patent
Nishino (10) Patent No.: US 6,244,607 B1
(45) Date of Patent: Jun. 12, 2001

(54) SUSPENSION DEVICE FOR AUTOMOBILE

(75) Inventor: Yutaro Nishino, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/389,091

(22) Filed: Sep. 2, 1999

(30) Foreign Application Priority Data

Sep. 2, 1998 (JP) .................................. 10-248822

(51) Int. Cl.[7] .................................. B60G 21/055
(52) U.S. Cl. .................. 280/124.107; 280/124.147; 280/124.152
(58) Field of Search .............. 280/124.106, 124.107, 280/124.145, 124.146, 124.147, 124.152; 267/220

(56) References Cited

U.S. PATENT DOCUMENTS

| | | | |
|---|---|---|---|
| D. 372,446 | * | 8/1996 | Hotchkis, Jr. ................. D12/159 |
| 3,957,128 | * | 5/1976 | LeSalver et al. . |
| 5,382,044 | * | 1/1995 | Smith et al. . |
| 6,099,004 | * | 8/2000 | Lin ................................ 280/124.107 |

OTHER PUBLICATIONS

SPS Product Catalogue, 3 pages.*

* cited by examiner

*Primary Examiner*—Paul N. Dickson
(74) *Attorney, Agent, or Firm*—Finnegan, Henderson, Farabow, Garrett & Dunner, L.L.P.

(57) ABSTRACT

A car such as automobile is provided with a suspension device and the suspension device is composed of a suspension frame to be mounted to a body of an automobile so as to extend in a bilateral width direction thereof, a pair of suspension arms mounted to both bilateral end portions of the suspension frame to be rotatable, a pair of strut suspensions extending upward in a mounted state from the suspension arms, respectively, a pair of strut support members each having an inverted bowl shape and having a lower portion fixed to the automobile body, the strut support members being provided with ceiling portions to which upper end portions of the strut suspensions are fixed, and a strut bar stretched between the strut support members so as to be operatively connected to the strut support members, the strut bar having both end portions in the width direction of the automobile body, which are fixed, through bar brackets, to the ceiling portions of the strut support members, respectively.

20 Claims, 6 Drawing Sheets

SUSPENSION DEVICE FOR AUTOMOBILE

BACKGROUND OF THE INVENTION

The present invention relates to a suspension device of an automobile particularly having a structure in which a pair of lateral strut suspensions disposed vertically are connected to upper end portions by a strut bar extending in a width (lateral) direction of a vehicle body.

A strut-type suspension device has been widely known as one-type of independent suspension devices for four-wheel drive-type cars such as automobiles. This strut-type suspension device has a structure in which an upper end portion of each of strut suspensions formed to be expandable by winding a coil spring around an outer periphery of a shock-absorber is secured to a car body side portion and a lower end of the strut suspension is operatively coupled to a free end side portion of a suspension arm by which wheels are supported.

FIG. 6 is a sectional view showing the fixing structure of the upper portion of a strut suspension 61 of the type mentioned above, and with reference to FIG. 6, an inverted bowl-shaped strut support member 62 is inserted into the car body 63 from the lower side thereof through a mounting hole 64 formed to the car body 63 and then fastened at its flanged portion 65 by means of a plurality of stud bolts 66 and nuts 67 to the peripheral portion of the mounting hole 64. The upper end portion 68 of the strut suspension 61 is fastened and secured to a ceiling portion (upper end portion) 73 of the strut support member 62 together with a cushion bush 69, a rebound cushion 70 and a rebound washer 71.

Figure 6:
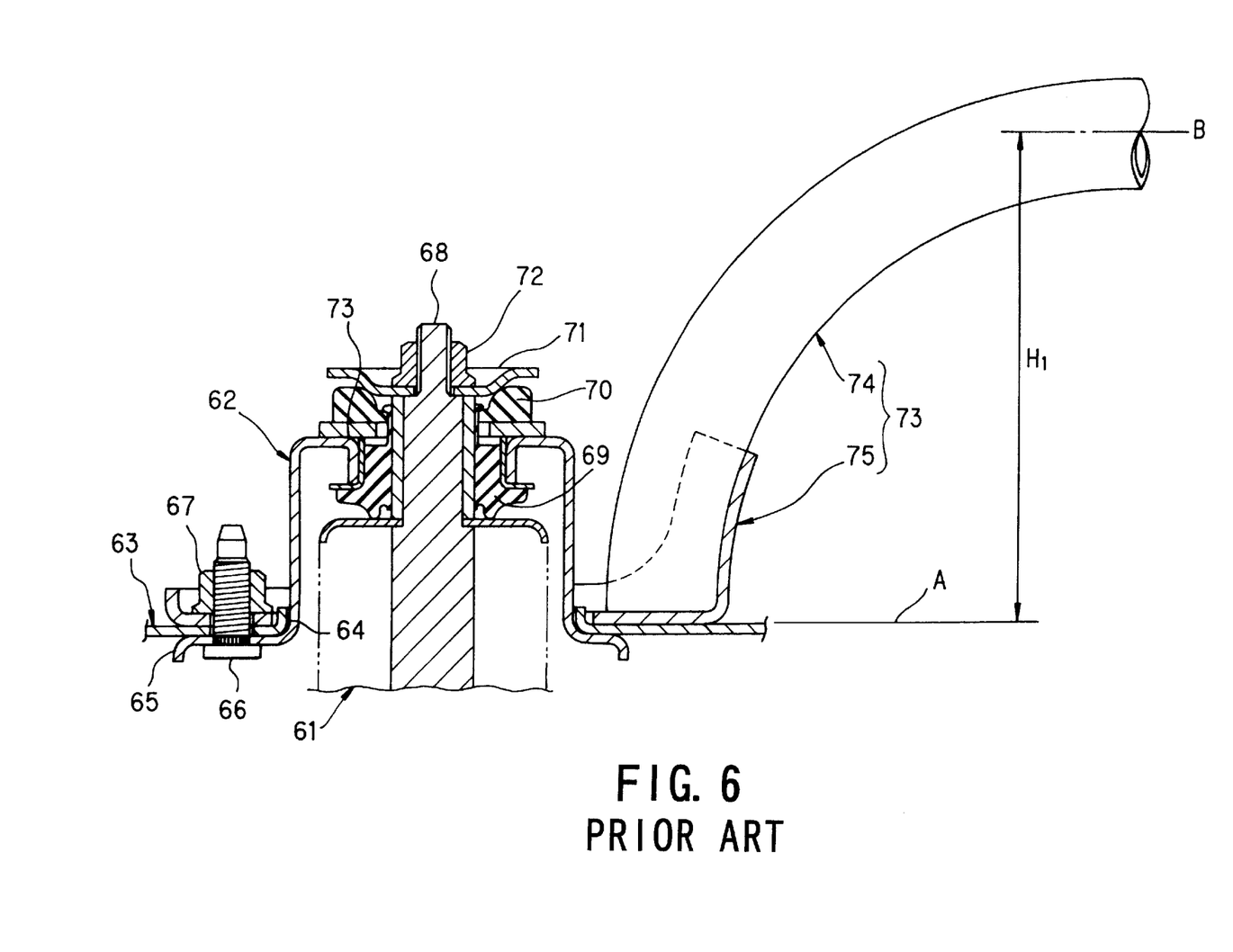
FIG. 6 is an elevational section of one example of a fixing structure at an upper portion of a conventional strut suspension.

Furthermore, in many structures, in order to improve rigidity of the car (automobile) body and suspension rigidity, a bilateral pair of strut support members 62 are coupled by means of strut bars 73. The strut bar 73 is formed from a metal bar pipe 74 having both ends to which substantially an annular (ring-shape) bar brackets 75 is secured by welding means, and a portion of the bar bracket 75 is fastened to the car body 63, i.e. peripheral portion of the mounting hole 64 together with the flanged portion 65 of the strut support member 62 by means of stud bolts and nuts 67.

In the structure of the conventional suspension device mentioned above, when the strut bar 73 is disposed, there is a possibility of the bar pipe 74 of the strut bar 73 interfering with a member such as engine, and in order to prevent such interfering, both the end portions of the bar pipe 74 are deeply bent downward and mounted to the bar bracket 75 thereby to increase the height of an intermediate portion of the bar pipe 74 with respect to a mounting surface portion of the bar bracket 75. That is, it is necessary to set a difference height $H_1$ between the level A of the mounting surface of the bar bracket 75 and the height B of the intermediate portion of the bar pipe 74 as shown in FIG. 6.

However, as mentioned before, since the bar bracket 75 is fixed to the car body portion 63 together with the flanged portion 65 of the strut support member 62, the level A of the mounting surface is a low level, it is obliged to make extremely large the dimension of the difference height $H_1$ to prevent the bar pipe 74 from interfering with the engine, for example. That is, in order to make large the dimension of the difference height $H_1$, it is obliged to make large the bending curvature of both the end portions of the bar pipe 74. It therefore becomes difficult to maintain high rigidity of the entire structure of the strut bar 73.

Furthermore, since there are many limitations of spaces at the peripheral portion of the mounting hole 64 of the bar bracket 75 in association with other members or parts to be located, in order to eliminate this defect, it is necessary to form the bar bracket 75 manufactured through a sheet metal press working in a complicated shape, resulting in a weak mechanical strength.

Still furthermore, since the bar bracket 75 having substantially an annular structure surrounding the strut support member 62, it is necessary make the inner diameter of the bar bracket 75 larger than the outer diameter of the strut support member 62, which results in increased size and increased weight of the bar bracket 75.

SUMMARY OF THE INVENTION

An object of the present invention is to substantially eliminate defects or drawbacks encountered in the prior art mentioned above and to provide a suspension device of an automobile capable of reducing the bending curvature of a strut bar at its both end portions thereby to ensure a high rigidity and to provide a simple and light structure of a bar bracket provided at both the end portions of the strut bar.

Another object of the present invention is to provide a suspension device of an automobile capable of easily mounting the strut bar to an automobile body.

A further object of the present invention is to provide a suspension device of an automobile having an increased size of a strut support member and a cushion plate fixed to a ceiling portion thereof.

A still further object of the present invention is to provide a suspension device of an automobile capable of making compact a strut support member, preventing interference thereof with other members and improving rigidity of an automobile body.

These and other objects can be achieved according to the present invention by providing a suspension device of an automobile comprising:

a suspension frame to be mounted to a body of an automobile so as to extend in a bilateral width direction thereof;

a pair of suspension arms mounted to both bilateral end portions of the suspension frame to be rotatable;

a pair of strut suspensions extending upward in a mounted state from the suspension arms, respectively;

a pair of strut support members each having an inverted bowl shape and having a lower portion fixed to the automobile body, the strut support members being provided with ceiling portions to which upper end portions of the strut suspensions are fixed; and a strut bar stretched between the strut support members so as to be operatively connected to the strut support members, the strut bar having both end portions in the width direction of the automobile body, which are fixed to the ceiling portions of the strut support members, respectively.

In a preferred embodiment, each of the ceiling portions is provided with an outer peripheral portion and a central portion, the outer peripheral portion being positioned higher in location level than the central portion, both the end portions of the strut bar are fixed to the outer peripheral portion of the ceiling portion of the strut member and the upper end portion of the strut suspension is fixed to the central portion of the ceiling portion.

Nut members are fixed to a lower surface portion of the outer peripheral portion of the ceiling portion of the strut support member and the strut bar is provided at each of the end portions thereof with a bar bracket, which is fastened to the nut members by fastening bolts at portions coincident with the nut members, respectively.

The suspension device further comprises a cushion plate mounted on the ceiling portion of each of the strut support member and the bar bracket is overlapped to the cushion plate, and the bar bracket and the cushion plate are fastened together to the nut members by the fastening bolts. In an alternation, the cushion plate has an outer peripheral portion to a lower portion of which the nut members are fixed, each of the strut support member being formed with a recessed portion and each of the bar bracket is overlapped to the cushion plate, and the bar bracket is fastened to the nut members by the fastening bolts.

Both the end portions of the strut bar are bend downward and connected to the ceiling portions of the strut support members through the bar brackets.

According to the suspension device of an automobile of the present invention of the structure mentioned above, since the bar brackets, at both the end portions of the strut bar, are fixed to the ceiling portions of the strut support members, the location level of the mounting surface of the bar bracket 17 is close to the location level of the intermediate portion of the bar pipe in comparison with the conventional structure shown in FIG. 6. That is, the height difference ($H_1$, in FIG. 6) therebetween can be reduced, and accordingly, the interference of the strut bar with the other members or parts such as engine can be effectively prevented.

Furthermore, the bending curvature of the strut bar at both the end portions thereof can be reduced, and hence, the rigidity of the entire structure of the strut bar can be improved. Moreover, the mounting position of the bar brackets can be made high thereby to reduce the possibility of the interference with the other members or parts, and accordingly, the shape of the bar bracket can be made simple and the mechanical strength thereof can be also improved. Still furthermore, since it is not necessary to locate the bar brackets so as to surround the outermost periphery of the strut support members, the diameter of the annular shape of the bar bracket can be made small, thus making compact and light weight the entire structure thereof.

Still furthermore, the outer peripheral portion of the ceiling portion of the strut support member is positioned in the level higher than the central portion thereof, the bar bracket is fixed to the outer peripheral portion by means of bolts, and the upper end portion of the strut suspension is fixed to the central portion. Accordingly, the necessary amount of the height difference can be reduced by the amount corresponding to the height difference between the outer peripheral portion and the central portion of the ceiling portion of the strut support member. Therefore, the bending curvature of the end portions of the strut bar can be made further small, thus further enhancing the rigidity of the entire structure of the strut bar, and moreover, the ceiling portions of the strut support members can also be improved in their rigidities, resulting in the improved mounting rigidity of the strut bar and the strut suspensions.

Still furthermore, in one example since the bar brackets are fastened to the nut members fixed to the lower surface of the outer peripheral portions of the ceiling portions by means of bolts, the mounting working of the strut bar, i.e. the bar brackets, can be easily performed, and moreover, since the cushion plates are firmly fastened together with the bar brackets to the nut members by the fastening bolts, the connecting strength of the strut support members and the cushion plates can also be extremely enhanced.

Still furthermore, in another example, it is not necessary to accommodate the nut members inside the strut support member, so that the outer diameter of the strut support member and the pitch circle diameter of the stud bolt can be made small without paying any attention to the pitch circle diameter of the nut member. Accordingly, the strut support member can be made compact and prevented from interfering with other members or parts.

The nature and further characteristic features of the present invention will be made more clear from the following descriptions made with reference to the accompanying drawings.

DESCRIPTION OF THE PREFERRED EMBODIMENT

A preferred embodiment of a suspension device of an automobile according to the present invention will be described hereunder with reference to the accompanying drawings.

Figure 1:
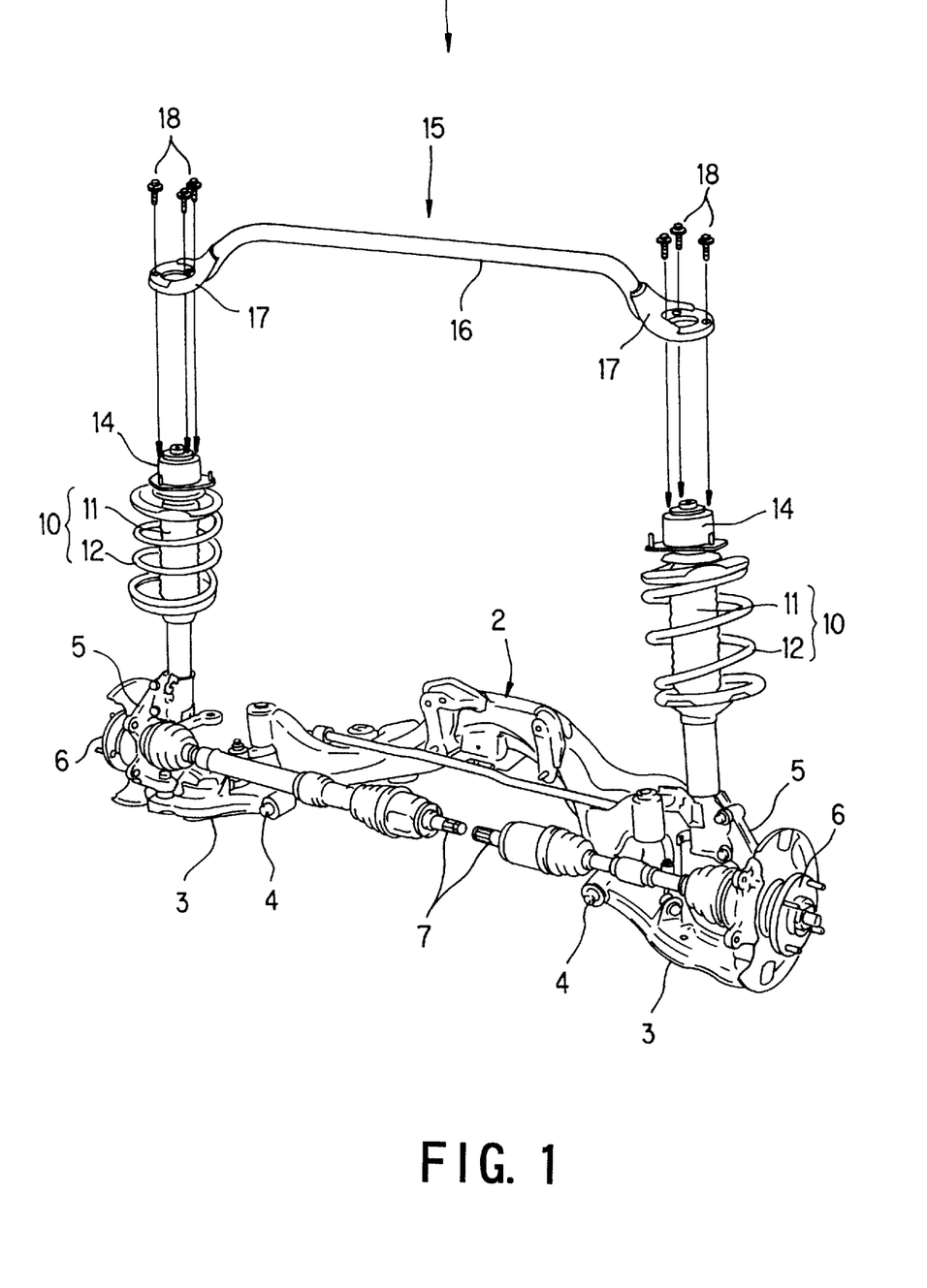
FIG. 1 is a perspective view of one embodiment of a suspension device of an automobile according to the present invention.

Referring to FIG. 1, a shown suspension device 1 is a strut-type suspension device independently suspending front wheels of a car such as automobile and is provided with a suspension frame 2 as a sub-frame member to be mounted to a car body side. The suspension frame 2 has bilateral end portions to which a pair of suspension arms 3 are mounted to be pivotal in a vertical direction about pivot shafts 4 as fulcrum members. Knuckles 5 are mounted to both the free end portions of the suspension arms 3, respectively, and hubs 6 for mounting front wheels are provided for the knuckles 5, respectively, to be rotatable. A bilateral pair of drive shafts 7 extend from the central portion of the suspension frame 2 and the end portions of the drive shafts 7 are coupled and fitted to the hubs 6, through which a driving power of an engine, not shown, of a car is transmitted to the front wheels.

Bilateral two strut suspensions 10 are provided for the respective suspension arms 3 perpendicularly as shown in FIG. 1, and each of the strut suspension 10 is constructed by winding a coil spring 12 around an outer peripheral surface of an expandable shock absorber 11. The lower end portion of the strut suspension 10 is coupled to the free end side of the suspension arm and the upper end portion is fixed to the car body side through a strut support member 14.

When the car is running, the suspension arms 3 are moved or rotated in the vertical direction, and the suspension arms 3 are rotated upward, the strut suspensions 10 are contracted, and according to the attenuation function of the shock absorbers 11, push-up shock of the suspension arms 3 can be damped. Thereafter, the strut suspensions 10 are expanded by the urging force of the coil springs 12 wound up around the shock absorbers 11 thereby to push down the suspension arms 3.

Further, the bilateral strut support members 14 are coupled by means of strut bar 15 extending between these strut support members 14 for the purpose of increasing suspension rigidity of the car body. The strut bar 15 is composed of a bar pipe 16 having a tubular structure and bar brackets 17, each being formed from a metal sheet material into substantially an annular shape (ring shape) through a press working, are fixed by means of welding, for example, to both end portions of the bar pipe 16. These bar brackets 17 are fixed to the upper end portions of the strut support members 10, respectively, by means of three bolts 18. In the vertical state illustrated in FIG. 1, both the end portions of the bar pipe 16 are slightly bent downward so that an intermediate portion of the bar pipe 16 is positioned at a level higher than the location of the bar brackets 17 thereby to prevent the bar pipe 16 from interfering with the engine or the like.

Figure 2:
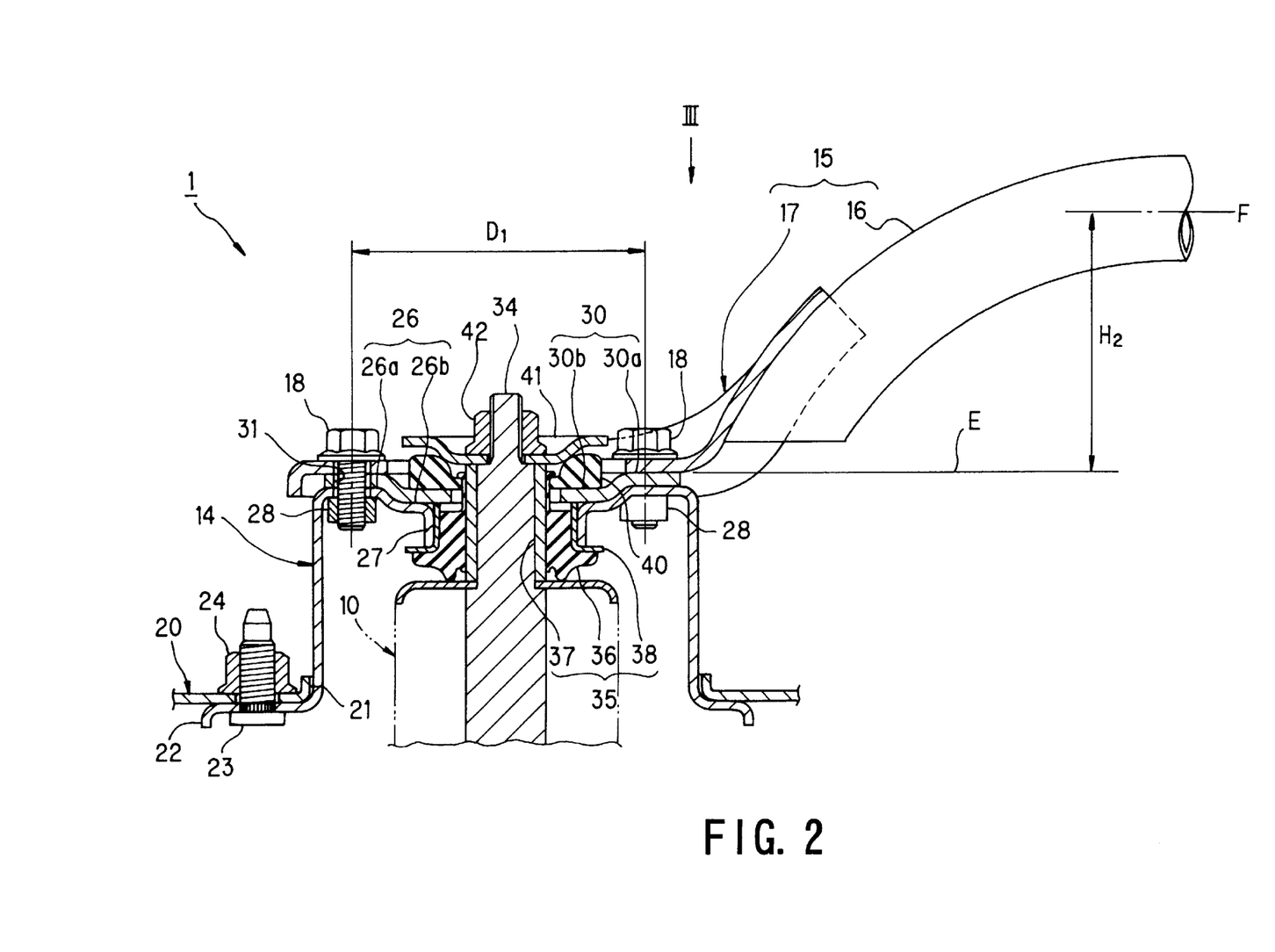
FIG. 2 is an elevational section of one example of a fixing structure at an upper portion of a strut suspension according to the present invention.
Figure 3:
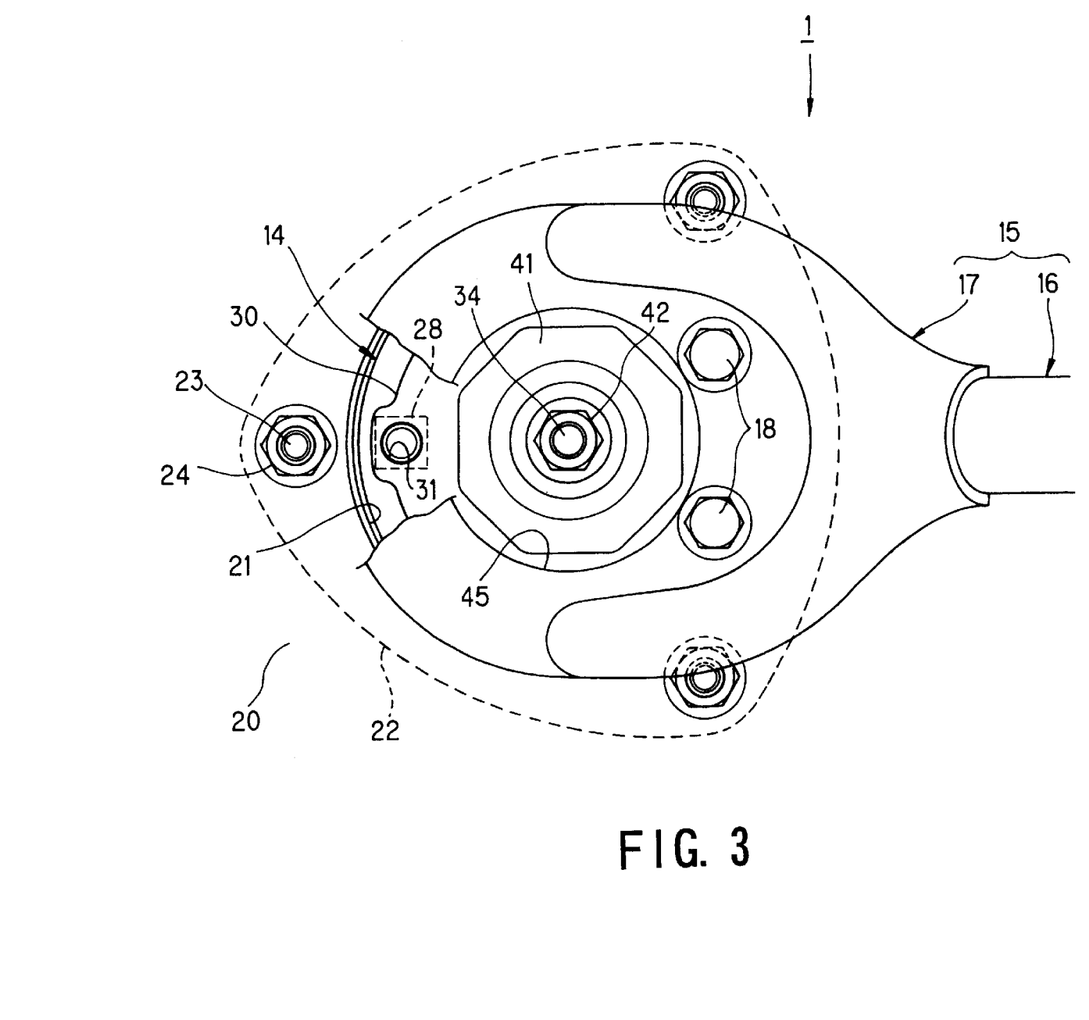
FIG. 3 is a plan view viewed from an arrowed direction III in FIG. 2.

FIG. 2 shows one example showing fixing structure of the strut suspension 10 at the upper end thereof and FIG. 3 is a plan view thereof as viewed from the arrowed direction III in FIG. 2. Further, it is to be noted that, in the following, although structure concerning only one side of the bilateral strut support members 10 is described, another one side thereof has substantially the same structure.

With reference to FIGS. 2 and 3, the strut support member 14, to which the upper end of the strut suspension 10 is fixed, is formed so as to provide an inverted bowl shape through a press working, for example and fixed to a portion of the car body 20 by inserting the strut support member 14, from the lower side thereof, into a mounting hole 21 formed to the car body 20. A flanged portion 22 having substantially a triangle shape in a plan view is formed to the lower portion of the strut support member 14 and top portions of the flanged portion 22 are fastened to the peripheral portion of the mounting hole 21 by three stud bolts 23 and nuts 24.

A ceiling portion (upper end portion in the shown mounted state) 26 of the strut support member 14 has an outer peripheral portion 26a and a central portion 26b which has a location level lower than that of the outer peripheral portion 26a. The center of the central portion 26b is formed with a hole having an inner peripheral edge folded downward so as to form a cylindrical cushion sleeve 27. Three nut members 28 are fastened to the lower surface of the outer peripheral portion 26a along a pitch circle diameter $D_1$.

A disc-shaped cushion plate 30 is secured above the ceiling portion 26 of the strut support member 10 by means of welding, for example. This cushion plate 30 also has an outer peripheral portion 30a and a central portion 30b which has a location level lower than that of the outer peripheral portion 30a so as to provide a shape corresponding to the recessed shape of the ceiling portion 26 of the strut support member 14. Furthermore, the outer peripheral portions 26a and 30a of the ceiling portion 26 and the cushion plate 30 are formed with three through holes 31, respectively, at portions in alignment with the corresponding three nut members 28.

A cushion bush 35 is mounted to a peripheral portion of a strut rod 34 projecting from the upper end portion of the strut suspension 10, and the outer peripheral portion of the cushion bush 35 is inserted, from the lower side, as viewed, into the cushion sleeve 27 of the strut support member 14. The cushion bush 35 is composed of a cylindrical cushioning member 36 formed of, for example, a rubber material, and metal inner pipe 37 and outer pipe 38 are fixed to the inner periphery and outer periphery of the cushioning member 36. The strut rod 34 is tightly fitted into the inner pipe 37 and the outer pipe 38 is tightly fitted into the cushion sleeve 27. In an alternation, the outer pipe 38 may be eliminated and, in such case, the cylindrical cushioning member 36 is directly fixed to the inner peripheral surface of the cushion sleeve 27 thereby to form the cushion bush 35.

Furthermore, an annular rebound cushion member 40 made of a rubber material and a disc-shaped rebound washer 41 made of a metal material are mounted to the strut rod 34 from the upper side thereof and are then fastened by means of nut 42. The strut rod 34 is relatively movable with respect to the strut support member 14 within the elasticity of the cushion bush 35 (i.e. cylindrical cushioning member 36) and the rebound cushion member 40 thereby to damp push-up shock and/or rebound shock of the suspension arm 3. At the time of the rebounding, the rebound cushion member 40 is contracted between the cushion plate 30 (central portion 30b thereof) and the rebound washer 41.

Incidentally, the bar brackets 17 provided to both the end portions of the strut bar 15 are formed so as to provide annular shapes, as mentioned before, through the press working, for example, and at each end of the strut bar 15, the bar bracket 17 is overlapped to the cushion plate 30 and then fixed together to the ceiling portion 26 of the strut support member 14 by three fastening bolts 18, which are also fastened with the nut members 28 fixed to the lower surface of the ceiling portion 26. Accordingly, the bar bracket 17 is fastened, together with the cushion plate 30, to the nut members 28 by means of fastening bolts 18.

In the state that the bar brackets 17 are fixed to the ceiling portions 26 of the strut support members 14, the strut rods 34, the rebound cushion members 40, the rebound washers 41, the nuts 42 and other associated portions project upward over the holes 45 formed to the central portions of the bar brackets 17. Accordingly, the strut suspensions 10 can be detached from the strut support members 14 after fixing to the strut bar 15.

According to the suspension device 1 of the present invention of the structure mentioned above, since the bar brackets 17 at both the end portions of the strut bar 15 are fixed to the ceiling portions 26 of the strut support members 14, the location level E of the mounting surface of the bar bracket 17 is close to the location level F of the intermediate portion of the bar pipe 16 in comparison with the conventional structure shown in FIG. 6. That is, the height difference $H_2$ between the location levels E and F is smaller than that $H_1$ of the conventional structure shown in FIG. 6. As mentioned hereinbefore, this height difference $H_2$ is set for the purpose of preventing the interference of the bar pipe 16 with the other members or parts such as engine.

Accordingly, the bending curvature of the bar pipe 16 at both the end portions thereof can be reduced, and hence, the rigidity of the entire structure of the strut bar 16 can be improved. Moreover, the mounting position of the bar brackets 17 can be made high thereby reduce the possibility of the interference with the other members or parts, and accordingly, the shape of the bar bracket 17 can be made simple and the mechanical strength thereof can be also improved. Still furthermore, since it is not necessary to locate the bar brackets 17 so as to surround the outermost periphery of the strut support members 14, the diameter of the annular shape of the bar bracket 17 can be made small, thus making compact and light weight the entire structure thereof.

Still furthermore, the outer peripheral portion 26a of the ceiling portion 26 of the strut support member 14 is positioned in the level higher than the central portion 26b thereof, the bar bracket 17 is fixed to the outer peripheral portion 26a by means of bolts 18, and the upper end portion (strut rod 34) of the strut suspension 10 is fixed to the central portion 26b. Accordingly, the necessary amount of the height difference $H_2$ can be reduced by the amount corresponding to the height difference between the outer peripheral portion 26a and the central portion 26b of the ceiling portion 26 of the strut support member 14. Therefore, the bending curvature of the end portions of the bar pipe 16 can be made further small, thus further enhancing the rigidity of the entire structure of the strut bar 15, and moreover, the ceiling portions 26 of the strut support members 14 can also be improved in their rigidities, resulting in the improved mounting rigidity of the strut bar 15 and the strut suspensions 10.

Still furthermore, since the bar brackets 17 are fastened to the nut members 28 fixed to the lower surface of the outer peripheral portions 26a of the ceiling portions 26 by means of bolts 18, the mounting working of the strut bar 15, i.e. the bar brackets 17, can be easily performed, and moreover, since the cushion plates 30 are firmly fastened together with the bar brackets 17 to the nut members 28 by the fastening bolts 18, the connecting strength of the strut support members 14 and the cushion plates 30 can also be extremely enhanced.

Figure 4:
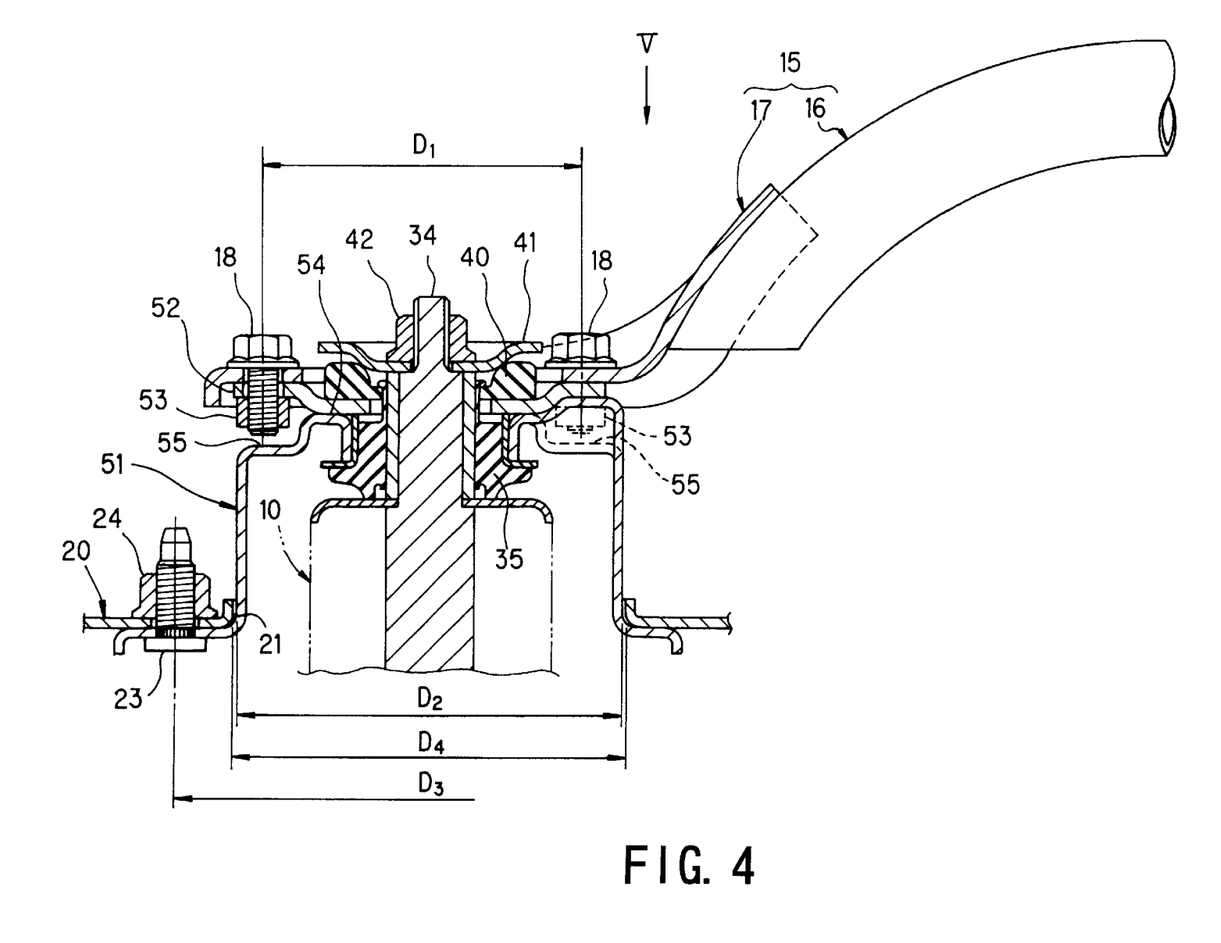
FIG. 4 is an elevational section of another example of a fixing structure at an upper portion of a strut suspension according to the present invention.
Figure 5:
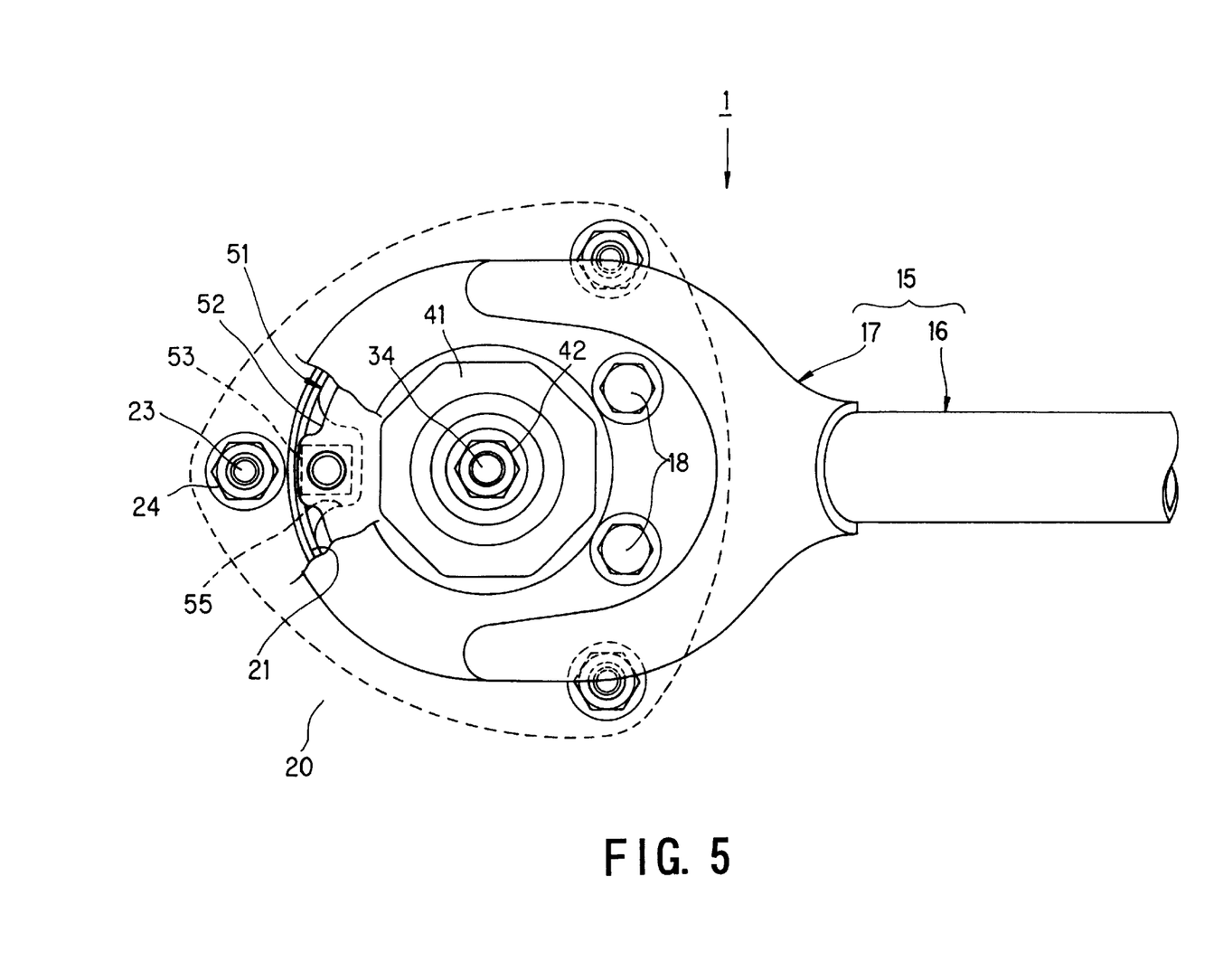
FIG. 5 is a plan view viewed from an arrowed direction V in FIG. 4.

FIG. 4 is an elevational section showing another example of the fixing structure at the upper end portion of the strut suspension 10 and FIG. 5 is a plan view as viewed from the arrowed direction V in FIG. 4. In this example, members or parts other than the strut support members, the cushion plates and the nut members have substantially the same structures as those of the above-mentioned first example such as shown in FIGS. 2 and 3, and accordingly, the descriptions thereof are omitted hereunder.

With reference to FIGS. 4 and 5, in this second example, three nut members 53 are not fixed to the lower surface of the ceiling portion 54 of the strut support member 51 as in the first example, and the three nut members 53 are fixed to the lower surface of the outer peripheral portion of a cushion plate 52 fixed to the ceiling portion 54. Three recessed portions 55 are formed to the outer peripheral portion of the strut support member 51 at portions corresponding to the locations of the nut members 53 so as to prevent the nut members 53 from interfering with the strut support member 51. The bar brackets 17 of the strut bar 15 are superposed on the cushion plates 52 and then fastened to the nut members 53 at the lower surfaces of the cushion plates 52 by means of three fastening bolts 18.

According to the structure of this example, it is not necessary to accommodate the nut members 53 inside the strut support member 53, so that the outer diameter $D_2$ of the strut support member 51 and the pitch circle diameter $D_3$ of the stud bolt 23 can be made small without paying any attention to the pitch circle diameter $D_1$ of the nut member 53. Accordingly, the strut support member 51 can be made compact and prevented from interfering with other members or parts. In addition, the inner diameter $D_4$ of the mounting hole 21 of the car body portion 20 can be made small, and since it is not necessary to make small the pitch circle diameter $D_1$ of the nut member 53, the fastening strength of the bar bracket 17 cannot be damaged.

It is to be noted that the present invention is not limited to the described embodiment and examples and many other changes may be made without departing from the scopes of the appended claims.

For instance, in the above examples, although the cushion bush 35 (cylindrical cushioning member 36) and the rebound cushion 40 are formed as separate members, these members may be integrated. Furthermore, in the above examples, three fastening bolts 18 and three nut members 28 (53) are utilized, two or four or more numbers of these members may be also utilized.

Furthermore, in the above examples, although the strut bar 15 is composed of three pieces such as bar pipe and the bilateral bar brackets 17, these members may be med integrally, for example, by one strut bar having a pipe and bar brackets which are integrally formed to h the end portions thereof by means of press working, example.

What is claimed is:

1. A suspension device of an automobile, comprising:
   a suspension frame adapted to mount to a body of an automobile so to extend in a width direction thereof, the suspension frame having two bilateral end portions;
   a suspension arm mounted to each bilateral end portion of suspension frame to be rotatable;
   a strut suspension extending upwardly in a mounted state from each suspension arm;
   a pair of strut support members, each having an inverted bowl shape and having a lower portion fixed to the automobile body, each said strut support member being provided with a ceiling portion to which an upper end portion of a respective strut suspension is fixed;
   a cushion plate mounted on the ceiling portion of each of the strut support members; and
   a strut bar having two end portions, each end portion being provided with a bar bracket, the strut bar being disposed in the width direction of the automobile body between the strut support members so as to be operatively connected to the strut support members, wherein each bar bracket is in overlapping contact with a respective cushion plate, and the bracket and respective cushion plate are fastened together.

2. A suspension device according to claim 1, wherein each of said ceiling portions is provided with an outer peripheral portion and a central portion, said outer peripheral portion being positioned higher in location level than the central portion, and wherein each end portion of said strut bar is fixed to the outer peripheral portion of the ceiling portion of a respective strut member and the upper end portion of each strut suspension is fixed to the central portion of the ceiling portion.

3. A suspension device according to claim 2, wherein nut means is fixed to a lower surface portion of said outer peripheral portion of the ceiling portion of each strut support member, and wherein each bar bracket is fastened to the nut means by fastening means.

4. A suspension device according to claim 3, wherein said nut means includes a plurality of nut members and said fastening means includes a plurality of fastening bolts, said nut members and said fastening bolts being coincident with each other in location positions.

5. A suspension device according to claim 1, wherein nut means is fixed to a lower portion of an outer peripheral portion of said cushion plate, and each strut support member is formed with a recessed portion corresponding to a location of the nut means and preventing the nut means from interfering with the strut support member.

6. A suspension device according to claim 1, wherein said strut bar has a substantially straight central portion and a curved portion at each end portion proximate the bar bracket.

7. An automobile suspension device, comprising:
   a suspension frame adapted to engage an automobile body, the suspension frame having two ends;

a suspension arm pivotably attached to each end of the suspension frame;

a strut suspension secured to each suspension arm;

a strut support member secured to each strut suspension, the strut support member comprising a unitary shell having an inverted bowl shape with a ceiling portion, the ceiling portion having an outer portion and a depressed central portion, the central portion having an opening receiving an upper portion of a respective strut suspension;

a cushion plate disposed on an upper surface of each ceiling portion; and a strut bar having two ends, wherein each end is disposed on a respective cushion plate.

8. The automobile suspension device of claim 7, further comprising:

a bar bracket disposed on each end of the strut bar.

9. The automobile suspension device of claim 8, further comprising:

a plurality of nuts secured to a lower surface of each ceiling portion, wherein each bar bracket is secured to a respective cushion plate by fasteners engaging the plurality of nuts.

10. The automobile suspension device of claim 8, further comprising:

a plurality of nuts secured to a lower surface of each cushion plate, wherein each bar bracket is secured to a respective cushion plate by fasteners engaging the plurality of nuts.

11. The automobile suspension device of claim 10, wherein each strut support member is provided with recesses to accommodate the plurality of nuts.

12. The automobile suspension device of claim 7, wherein each cushion plate is substantially disk-shaped with a central opening receiving a respective strut suspension.

13. The automobile suspension device of claim 7, wherein each cushion plate is arranged concentrically with a respective ceiling portion.

14. The automobile suspension device of claim 7, wherein each strut suspension comprises a shock absorber and a spring.

15. The automobile suspension device of claim 7, wherein a lower portion of each strut support member is attached to the automobile body.

16. The automobile suspension device of claim 7, wherein the opening in the central portion of each ceiling portion receives a cushion bushing disposed on an upper portion of a respective strut suspension to limit the upward travel of the strut suspension.

17. An automobile suspension system, comprising:

a suspension frame adapted to engage an automobile body, the suspension frame having two ends;

a suspension arm pivotably attached to each end of the suspension frame;

a suspension subassembly disposed on each suspension arm, the subassembly comprising:

a strut suspension secured to the suspension arm;

a unitary strut support member having an inverted bowl shape with a ceiling portion, the ceiling portion having an outer peripheral portion, a depression defining a central portion, and an opening in the central portion receiving the strut suspension; and a cushion plate disposed on an upper surface of the ceiling portion; and a strut bar having two ends, wherein each end is disposed on the cushion plate of a respective suspension subassembly.

18. The automobile suspension system of claim 17, wherein each cushion plate has an outer peripheral portion and a central portion engaging respective outer peripheral portions and central portions of respective ceiling portions.

19. The automobile suspension system of claim 18, further comprising:

a rebound cushion member secured in place with a rebound washer on an upper surface of the central portion of each cushion plate.

20. The automobile suspension system of claim 17, wherein each cushion plate is substantially disk-shaped with a central opening receiving a respective strut suspension.

\* \* \* \* \*